United States Patent
Morganson et al.

(10) Patent No.: US 11,331,860 B2
(45) Date of Patent: May 17, 2022

(54) POWDER REMOVAL

(71) Applicant: Hamilton Sundstrand Corporation, Charlotte, NC (US)

(72) Inventors: David W. Morganson, Marlborough, CT (US); Brendan T. Gustafson, East Hartford, CT (US); Jason J. Purdy, East Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 103 days.

(21) Appl. No.: 16/454,708

(22) Filed: Jun. 27, 2019

(65) Prior Publication Data
US 2020/0406546 A1    Dec. 31, 2020

(51) Int. Cl.
*B29C 64/153*   (2017.01)
*B29C 64/35*    (2017.01)
(Continued)

(52) U.S. Cl.
CPC ............ *B29C 64/35* (2017.08); *B29C 64/153* (2017.08); *B29C 64/20* (2017.08); *B33Y 10/00* (2014.12); *B33Y 30/00* (2014.12); *B33Y 40/00* (2014.12)

(58) Field of Classification Search
CPC ..... B29C 64/255; B29C 64/35; B29C 64/357; B22F 10/60; B22F 10/66; B22F 10/70; B22F 10/73; B33Y 30/00
See application file for complete search history.

(56) References Cited

U.S. PATENT DOCUMENTS

2017/0072466 A1    3/2017  Zehavi et al.
2017/0129180 A1*   5/2017  Coates ................... B22F 12/00
(Continued)

FOREIGN PATENT DOCUMENTS

DE    202016003042 U1    7/2016
DE    102016107769 A1   11/2016
(Continued)

OTHER PUBLICATIONS

Extended European Search Report dated May 8, 2020, issued during the prosecution of European Patent Application No. EP 19213577.0.

*Primary Examiner* — Joseph S Del Sole
*Assistant Examiner* — Margaret B Hayes
(74) *Attorney, Agent, or Firm* — Locke Lord LLP; Joshua L. Jones; Scott D. Wofsy

(57) ABSTRACT

A system includes an enclosed laser powder bed fusion (LPBF) containment volume. A powder drain is included below the containment volume configured to receive powder dropping from the containment volume by force of gravity. A valve below the powder drain is configured to allow passage with the valve in an open state of unfused powder from the drain into a powder collection volume separated from the containment volume by the valve, and prevent passage of powder from the drain into the collection volume with the valve in a closed state. A source of wetting agent is in fluid communication with the powder collection volume for capturing powder in the collection volume by wetting the powder. A moisture trap is operatively connected to the drain above the valve and is configured to capture moisture to prevent moisture from the collection volume migrating into the containment volume.

9 Claims, 2 Drawing Sheets

(51) Int. Cl.
*B33Y 10/00* (2015.01)
*B33Y 30/00* (2015.01)
*B33Y 40/00* (2020.01)
*B29C 64/20* (2017.01)

(56) References Cited

U.S. PATENT DOCUMENTS

| | | |
|---|---|---|
| 2018/0345372 A1 | 12/2018 | Corsmeier |
| 2018/0370213 A1 | 12/2018 | Gold et al. |
| 2019/0001413 A1* | 1/2019 | Golz ................. B22F 10/70 |
| 2019/0070662 A1 | 3/2019 | Amaya et al. |
| 2019/0151954 A1* | 5/2019 | Xiao .................. B22F 8/00 |
| 2020/0331062 A1* | 10/2020 | Coates ............... B23Q 11/0891 |

FOREIGN PATENT DOCUMENTS

| | | | |
|---|---|---|---|
| EP | 3473360 A1 | 4/2019 | |
| WO | WO-2015189600 A2 * | 12/2015 | ............. B23C 1/002 |
| WO | 2017/196355 | 11/2017 | |

* cited by examiner

POWDER REMOVAL

BACKGROUND OF THE INVENTION

1. Field of the Invention

The present disclosure relates to additive manufacturing, and in particular to powder removal from additive manufacturing systems.

2. Description of Related Art

After building a part using an additive manufacturing process that utilize stock powder, such as laser powder bed fusion (LPBF), the unfused powder must be removed from the part and from the build platform. Depending on what alloys are included in the stock powder, the loose powder can qualify as a hazardous material. Gravity and gas movement can be used to drive the loose powder down a powder drain while still contained within a sealed containment volume to prevent powder from escaping into the open.

The conventional techniques have been considered satisfactory for their intended purpose. However, there is an ever present need for improved systems and methods for powder removal. This disclosure provides a solution for this need.

SUMMARY OF THE INVENTION

A system includes an enclosed laser powder bed fusion (LPBF) containment volume. A powder drain is included below the containment volume configured to receive powder dropping from the containment volume by force of gravity. A valve below the powder drain is configured to allow passage with the valve in an open state of unfused powder from the drain into a powder collection volume separated from the containment volume by the valve, and prevent passage of powder from the drain into the collection volume with the valve in a closed state. A source of wetting agent is in fluid communication with the powder collection volume. The source of wetting agent connects downstream of the valve for capturing powder in the collection volume by wetting the powder. A moisture trap is operatively connected to the drain above the valve and is configured to capture moisture to prevent moisture from the collection volume migrating into the containment volume.

The moisture trap can include a cooling tube. The cooling tube can be operatively connected to a cryogenic cooling system. The cryogenic cooling system can be configured to cryogenically cool the cooling tube in a moisture trapping mode, and to heat the cooling tube after part removal from the containment volume for cleaning the moisture trap to reset the moisture trap.

The containment volume can include a pair of sealed access gloves operatively connected to the containment volume to allow a user outside the containment volume to manipulate a part inside the containment volume to remove unfused powder from the part. The containment volume can include a robotic manipulation system operatively connected to the containment volume to allow automated or remote controlled manipulation of a part inside the containment volume to remove unfused powder from the part.

A filter flow path can be included in fluid communication with the valve for recycling unfused powder into the containment volume for use in a subsequent build. The source of wetting agent can include a source of deionized water. The source of wetting agent can include a source of silicon based oil.

A method includes building a part using laser powder bed fusion (LPBF) within a containment volume, removing unfused powder from the containment volume, and wet trapping the unfused powder. The method includes capturing moisture from wet trapping to prevent the moisture from reaching the part in the containment volume.

Capturing moisture can include condensing moisture on a cooling tube. The method can include cryogenically cooling the cooling tube. The method can include removing the part from the containment volume after removal of the unfused powder, and heating the cooling tube to remove condensate therefrom to reset the cooling tube. Removing unfused powder from the containment volume can include manipulating the part to remove trapped powder from the part. The method can include recycling at least a portion of the unfused powder for reuse in a subsequent build.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
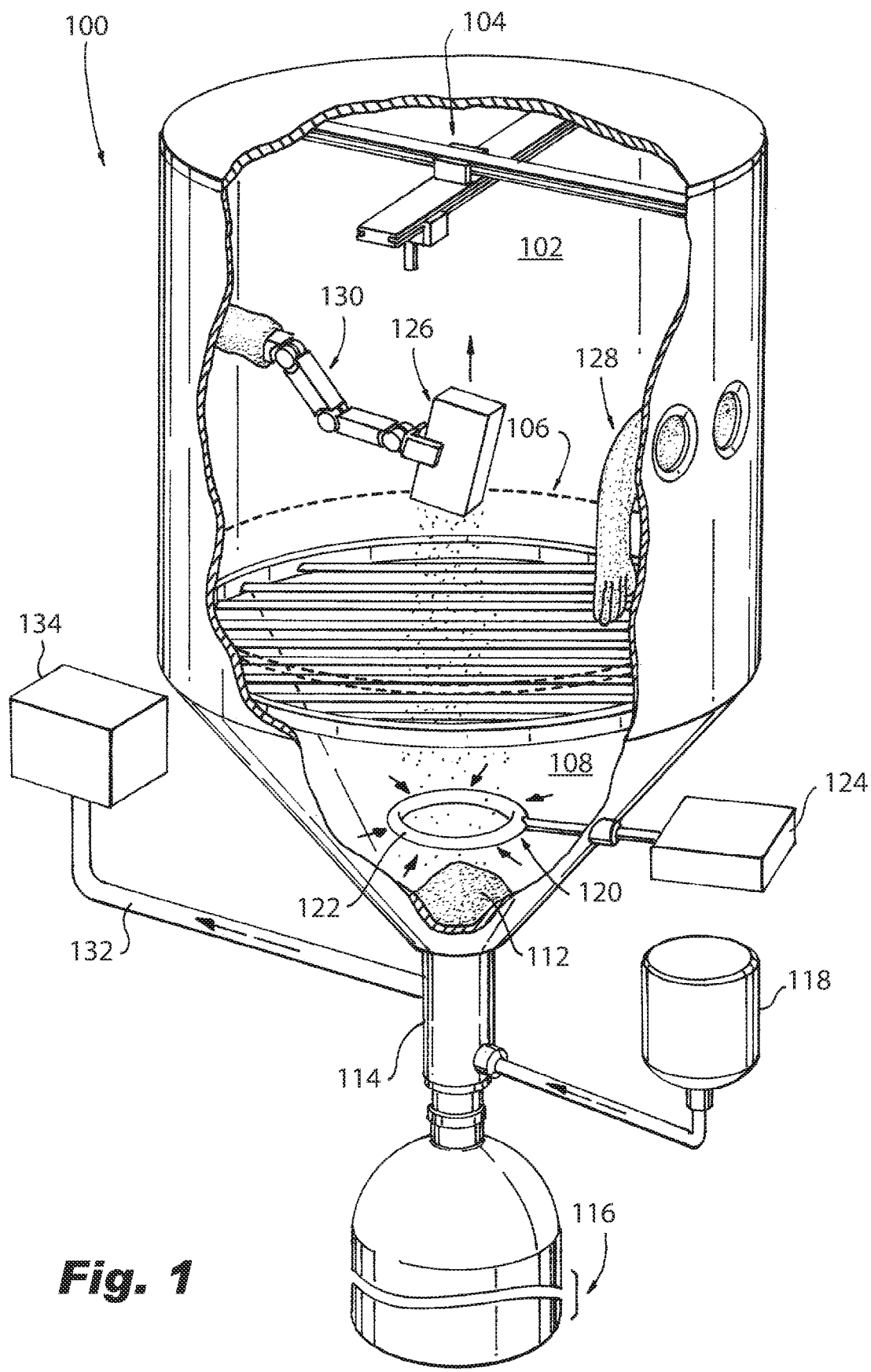
FIG. 1 is a schematic view of an embodiment of a system constructed in accordance with the present disclosure, showing a part in the containment volume after a build and during removal of unfused powder.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to reduce or prevent moisture migration into a containment volume during wet capture of unfused powder in additive manufacturing.

The system 100 includes an enclosed laser powder bed fusion (LPBF) containment volume 102, which includes laser equipment 104 and powder bed equipment 106, which are shown schematically in broken lines. A powder drain 108 is included below the containment volume 102. A grate 110 separates between the containment volume 102 and the funnel of the drain 108. The drain 108 is configured to receive powder 112 dropping from the containment volume 102 by force of gravity, as indicated in FIG. 1 by stippling. A valve 114 below the powder drain 108 is configured to allow passage (with the valve 114 in an open state) of unfused powder 112 from the powder drain 108 into a powder collection volume 116 separated from the containment volume 102 by the valve 114. In its closed position, the valve 114 prevents passage of powder 112 from the drain into the collection volume 116.

A source 118 of wetting agent is selectively in fluid communication with the powder collection volume 116. The source 118 of wetting agent connects downstream of the valve 114 (relative to the flow of powder 112) for capturing powder 112 in the collection volume 116 by wetting the powder 112. The source 118 of wetting agent can include a source of deionized water, silicon based oil, or any other suitable wetting agent.

A moisture trap 120 is operatively connected to the powder drain 108 in a portion of the powder drain 108 above the valve 114. The moisture trap 120 and is configured to capture moisture (as indicated by the small converging arrows in FIG. 1) to prevent moisture from the collection volume 116 migrating into the containment volume 102. The moisture trap 120 includes a cooling tube 122, which can be a simple loop as shown, or any other suitable coil, cooled baffling arrangement or pattern configured to trap moisture by condensing or congealing the moisture on the cooling tube or baffling 122. The cryogenic cooling system 124 is configured to cryogenically cool the cooling tube 122 in a moisture trapping mode. There is also a moisture releasing mode described below with reference to FIG. 2.

With continued reference to FIG. 1, the containment volume includes a pair of sealed access gloves 128 operatively connected to the containment volume 102 to allow a user outside the containment volume 102 to manipulate a part 126 inside the containment volume 102 to remove unfused powder 112 from the part 126. In addition to or in lieu of the sealed access gloves 128, the containment volume can include a robotic manipulation system 130 operatively connected to the containment volume 102 to allow automated or remote controlled manipulation of a part 126 inside the containment volume 102 to remove unfused powder 112 from the part 126, e.g. to remove powder that is trapped inside part 126 without manipulation. Recycling system 134 may include a fan powered dry air filter, and/or optionally, a fan powered second stage wet separator located above the liquid level. The purpose of the fan powered filter 134 is to cause a pressure differential inside the chamber of the containment volume 102, which encourages a flow of gas from chamber, through the liquid from source 118, entraining the powder to be collected in the liquid while reducing powder swirling in the chamber. The gas coming out of the filter flow path 132 may be vented, or optionally returned to the chamber in a closed loop.

Figure 2:
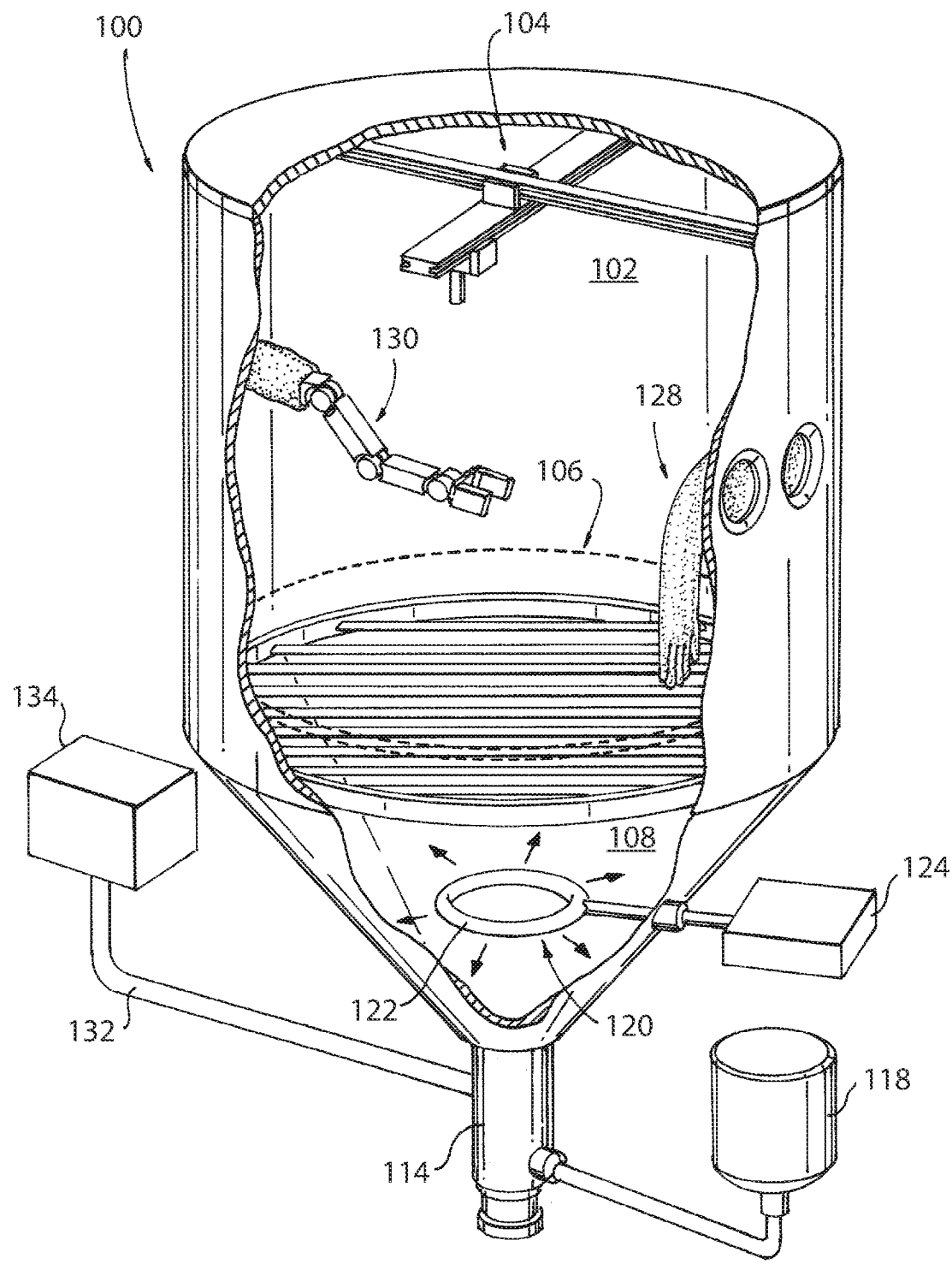
FIG. 2 is schematic view of the system of FIG. 1, showing removal of moisture from the moisture trap after removal of the part and unfused powder.

A method includes building a part (e.g., part 126) using laser powder bed fusion (LPBF) within a containment volume (e.g. containment volume 102), removing unfused powder (e.g. unfused powder 112) from the containment volume, and wet trapping the unfused powder. The method includes capturing moisture from wet trapping to prevent the moisture from reaching the part in the containment volume. Capturing moisture includes condensing moisture on a cooling tube (e.g., cooling tube 122). The method includes removing the part from the containment volume after removal of the unfused powder, and heating the cooling tube (e.g., in a moisture releasing mode as indicated in FIG. 2 by the radiating arrows) to remove condensate therefrom to reset the cooling tube for a subsequent powder removal cycle. Heating the cooling tube can, for example, include reversing a cryogenic cycle in the cryogenic system 124, after removal of an additively manufactured part 126 from the containment volume 102 as indicated in FIG. 2. Optionally, the part can be bagged inside the build chamber before removal from the build chamber to prevent moisture exposure when removing the part from the build chamber.

A wet capture system can offer a number of potential benefits over traditional dry collection methods. Under normal conditions, unfused powder falls into the collection volume, accumulates in dry form, and is subsequently transferred to a separate waste container for shipment. These conditions can create undue hazards for employees and increase the risk of non-compliance. Wet trapping unfused powder addresses these concerns by reducing/eliminating associated hazards and reducing regulatory requirements.

Handling dry powder can raise a number of potential health and safety concerns. Transferring dry powder can potentially risk exposing personnel to a range of potential inhalation hazards, skin and respiratory sensitizers, carcinogens and other hazardous elements through the generation of airborne dust. It can also potentially increase the risk of fire and explosions as some dry powders may be highly reactive and ignitable under certain conditions. A wet capture system can effectively address these issues through the reduction/ elimination of airborne dust. In addition, the powder can be more safely handled since it is no longer capable of igniting once wet.

Wet trapping unfused powder can also reduce a facility's regulatory obligations and can narrow the scope of applicability. Additional compliance burden can potentially be avoided through the elimination of specific regulatory requirements associated with increased hazardous waste generation. Dry powder, considered a characteristic hazardous waste under the Resource, Conservation and Recovery Act (RCRA), when wetted is rendered a non-hazardous waste subject to reduced regulatory requirements and costs associated with management and disposal. Further, a system designed to wet unfused powder while physically connected to the equipment, intrinsic to the production process, may apply additional RCRA exemptions and exclusions that further reduce hazardous waste generation, and thereby impose fewer regulatory obligations.

Systems and techniques as described herein can provide the potential benefit of removing moisture from the system during wet trapping of powder. This can allow for parts, e.g., aerospace parts made of materials that cannot be exposed to moisture, to be built using additive manufacturing and wet capture, without hazarding exposure of the part to the moisture used in the wet capture. This allows designers to expand beyond the design space of traditional techniques for part designs and materials, for example in laser powder bed fusion (LPBF), where wet capture is pertinent, but where exposing a part to moisture is not an option.

The methods and systems of the present disclosure, as described above and shown in the drawings, provide for reduction or prevention moisture migration into a containment volume during wet capture of unfused powder in additive manufacturing. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A system comprising:
an enclosed laser powder bed fusion (LPBF) containment volume;
a powder drain below the containment volume configured to receive powder dropping from the containment volume by force of gravity;

a valve below the powder drain relative to gravity configured to:
  allow passage with the valve in an open state of unfused powder from the drain into a powder collection volume separated from the containment volume by the valve; and
  prevent passage of powder from the powder drain into the collection volume with the valve in a closed state, wherein the powder drain is below the containment volume relative to gravity and the valve is below the powder drain relative to gravity and the collection volume is below the valve relative to gravity so that that powder flows in the direction of gravity directly from the powder drain to the collection volume with the calve in the open state;
a source of wetting agent selectively in fluid communication with the powder collection volume, wherein the source of wetting agent connects downstream of the valve, relative to gravity, for capturing powder in the collection volume by wetting the powder; and
a moisture trap operatively connected to the powder drain above the valve relative to gravity configured to capture moisture to prevent moisture from the collection volume migrating into the containment volume.

2. The system as recited in claim 1, wherein the moisture trap includes a cooling tube.

3. The system as recited in claim 2, wherein the cooling tube is operatively connected to a cryogenic cooling system.

4. The system as recited in claim 3, wherein the cryogenic cooling system is configured to cryogenically cool the cooling tube in a moisture trapping mode, and to heat the cooling tube after part removal from the containment volume for cleaning the moisture trap to reset the moisture trap.

5. The system as recited in claim 1, wherein the containment volume includes a pair of sealed access gloves operatively connected to the containment volume to allow a user outside the containment volume to manipulate a part inside the containment volume to remove unfused powder from the part.

6. The system as recited in claim 1, wherein the containment volume includes a robotic manipulation system operatively connected to the containment volume to allow automated or remote controlled manipulation of a part inside the containment volume to remove unfused powder from the part.

7. The system as recited in claim 1, further comprising a filter flow path in fluid communication with the valve for recycling unfused powder into the containment volume for use in a subsequent build.

8. The system as recited in claim 1, wherein the source of wetting agent includes a source of deionized water.

9. The system as recited in claim 1, wherein the source of wetting agent includes a source of silicon based oil.

\* \* \* \* \*